No. 636,536. Patented Nov. 7, 1899.
L. LIAIS.
UNPUNCTURABLE ARMOR FOR PNEUMATIC TIRES.
(Application filed June 23, 1899.)

(No Model.)

Witnesses:
F. W. Himan
Peter N. Ross

Inventor:
Lucien Liais
by Henry Connett
his Attorney

UNITED STATES PATENT OFFICE.

LUCIEN LIAIS, OF PARIS, FRANCE.

UNPUNCTURABLE ARMOR FOR PNEUMATIC TIRES.

SPECIFICATION forming part of Letters Patent No. 636,536, dated November 7, 1899.

Application filed June 23, 1899. Serial No. 721,556. (No model.)

*To all whom it may concern:*

Be it known that I, LUCIEN LIAIS, a citizen of the French Republic, residing at Paris, France, have invented certain new and useful Improvements in Armor for Pneumatic Tires, of which the following is a specification.

This invention relates to means for preventing the puncturing of pneumatic tires of vehicles, such as velocipedes. Heretofore much difficulty has been found in getting a satisfactory armor for this purpose for the reason that ordinary supple or flexible materials are not resistant to tacks, nails, &c., and that suitably resistant materials, metal particularly, are not, as ordinarily provided, sufficiently supple and flexible, owing to the form of the tire, and deprive it of that elasticity which is its essential quality. My invention overcomes in a notable degree, if not wholly, both of the above objections by furnishing a light, flexible, and practically nonpuncturable armor for lining the tire and interposing between the outer shoe or tube and the inner tube.

Figure 1:
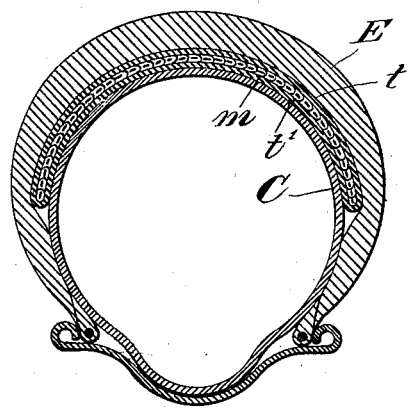
Figure 2:
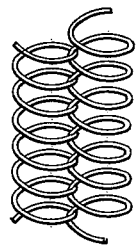
Figure 3:
Figure 4:
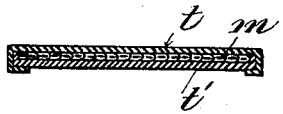

In the accompanying drawings, which illustrate an embodiment of the invention, Figure 1 is a cross-section of a pneumatic tire provided with my improved armor. Figs. 2 and 3 are views, on a much-exaggerated scale, showing how the coils of wire are interwoven or intercoiled for forming the armor. Fig. 4 is a cross-section of the armor detached.

In constructing my armor I connect together, side by side, as seen in Figs. 2 and 3, a sufficient number of very slender coils of fine wire, preferably steel wire. The whirls of the coils are interlocked, as shown in the drawings, whereby a sort of metallic cloth is formed. In forming this wire fabric the whirls of the coils should be kept as close together as practicable. After the coils are thus interwoven the fabric is flattened by rolling, whereby the thickness is greatly reduced and all interspaces closed. The resultant of this operation is a strip of flexible, supple, metallic cloth, very resistant to sharp puncturing objects, such as tacks, &c. This strip of armor fabric is cut into pieces of the proper length and width for a tire and laid between plies of ordinary cloth. This compound fabric is then inserted between the "shoe" or outer tube of the tire and the inner tube thereof.

In Figs. 1 and 4, E is the outer tube of the tire, and C the inner tube, which is to be inflated. Between these is inserted or placed the armor, which comprises the wire fabric $m$ and the cloth coverings $t$ and $t'$ thereof.

As the edges of the wire fabric $m$ are apt to be more or less rough, to prevent them from cutting or otherwise damaging the cloth covering metal fabric may be first covered with paper, folded over the rough edges, and pasted down, and the cloth cover then applied.

The strength or resisting power of the armor may obviously be increased by the employment of thicker wire or diminished by using finer wire.

I am aware that it is not new, broadly, to employ a fabric of interlaced wire coils as a tire-protector; but I am not aware of a fabric for this purpose having the peculiar construction and characteristics of my fabric—namely, a strip of fabric having the coils of fine wire extending transversely of the strip and flattened, so as to reduce the size of the interstitial apertures in the strip.

Having thus described my invention, I claim—

A strip of armor for a pneumatic tire, consisting of laterally interlaced or interwoven slender coils of fine wire extending transversely of the strip and flattened after interlacing in order to reduce the interstitial apertures in the strip, substantially as set forth.

In witness whereof I have hereunto signed my name, this 25th day of May, 1899, in the presence of two subscribing witnesses.

LUCIEN LIAIS.

Witnesses:
 EDWARD P. MACLEAN,
 ALEXANDER MATHIEU.